United States Patent [19]

Kirk

[11] Patent Number: 4,484,219

[45] Date of Patent: Nov. 20, 1984

[54] ELECTRONICALLY GENERATED HOLOGRAPHY

[75] Inventor: Ronald L. Kirk, Findlay, Ohio
[73] Assignee: The Holotronics Corporation, Findlay, Ohio
[21] Appl. No.: 389,042
[22] Filed: Jun. 16, 1982
[51] Int. Cl.$^3$ .............................................. H04N 9/54
[52] U.S. Cl. .................................... 358/90; 358/209; 358/213; 358/236; 350/362
[58] Field of Search ..................... 358/90, 2, 209, 213, 358/199, 201, 202, 236; 350/3.66, 362

[56] References Cited

U.S. PATENT DOCUMENTS

| | | |
|---|---|---|
| 3,506,327 | 4/1970 | Leith . |
| 3,529,083 | 9/1970 | Nelson . |
| 3,533,674 | 10/1970 | Brooks . |
| 3,614,190 | 10/1971 | Haines . |
| 3,625,584 | 12/1971 | St. John . |
| 3,632,183 | 1/1972 | Haines . |
| 3,639,029 | 2/1972 | Haines . |
| 3,640,598 | 2/1972 | Neeley . |
| 3,655,258 | 4/1972 | Hildebrand . |
| 3,701,586 | 10/1972 | Goetz ................................. 358/90 |
| 3,715,482 | 2/1973 | Haines . |
| 3,721,312 | 3/1973 | St. John . |
| 3,746,785 | 7/1973 | Goodrich ........................... 358/90 |
| 3,879,989 | 4/1975 | Brenden . |
| 3,894,787 | 7/1975 | Leith . |
| 3,900,884 | 8/1975 | St.John . |
| 3,947,630 | 3/1976 | Javan ................................. 358/90 |
| 3,996,552 | 12/1976 | Wolber . |

OTHER PUBLICATIONS

"Hologon" System Cuts Cost of Laser Scanners, Engineering News.
10,240 Pixel Focal Plane with Five Butted 2,048×96 Element TDI CCDs by Bradley et al., Proceedings of SPIE, vol. 175, 1979.
Terminal Puts Three-dimensional Graphics on Solid Ground by Stover, Electronics, Jul. 28, 1981.
Real-Time Holographic Interferometry.
A High Resolution Buttable Time Delay and Integrate Imaging CCD by Ibrahim, et al., Presentation, 1978 International Conference on the Application of Charge Coupled Devices, San Diego, Calif.
Electrooptical Properties of Dipole Fluids and Their Applications to Displays by Marks, Presentation at NEREM 73, IEEE Northeast Electronic Research and Engineering Meeting, Boston, Mass., 1973.
B. Carquille, C. Froehly, "Real-time High-resolvance Image Correlation by Bragg Diffraction in Saturable Absorbers", Appl. Opt., 19, 207 (1980).
F. J. Kuechel, H. J. Tizione, "Real-time Contour Holograpy Using BSO Crystals", Otp. Comm. 38, 17 (1981).
J. P. Huignard and J. P. Herriau, "Real-time Double--exposure Interferometry with $Bi_{12}SiO_{20}$ Crystals in Transverse Electrooptic Configuration", App. Opt. 16, 1807 (1977).
O. V. Gofaizen and A. V. Mindel, "Television Transmission of Fresnel Holograms", Telecommun. Radio Eng. V. 32-33, 105 (1978).

*Primary Examiner*—Howard W. Britton
*Attorney, Agent, or Firm*—Mueller and Smith

[57] ABSTRACT

Holographic data in the form of electronic signals is generated through the utilization of two planar transparent supports between which is positioned an electro-optical dipolar medium which is normally opaque but light transmissive in the presence of an applied electric field. Orthogonally disposed arrays of transparent electrodes are positioned upon the transparent supports and are arranged to be sequentially scanned in sampling fashion to define a sequence of uniform electric fields forming apertures of consistent effective diameter. One of the surfaces of the supports receives the interference pattern generated by the reference and object illumination emanating from a coherent source and the opposite support is operatively associated with a photodetecting arrangement. Through the generation of scanning synchronization signals and data signals from the photodetectors, an electronic representation of holographic data is achieved. To reconstruct these data, the same form of support and normally opaque dipolar medium is employed in conjunction with a control scanning arrangement wherein electrical fields corresponding with interference pattern intensity are provided. This arrangement may be utilized in conjunction with a reference beam of coherent light to derive a virtual image corresponding with the initially constructed holographic data.

46 Claims, 10 Drawing Figures

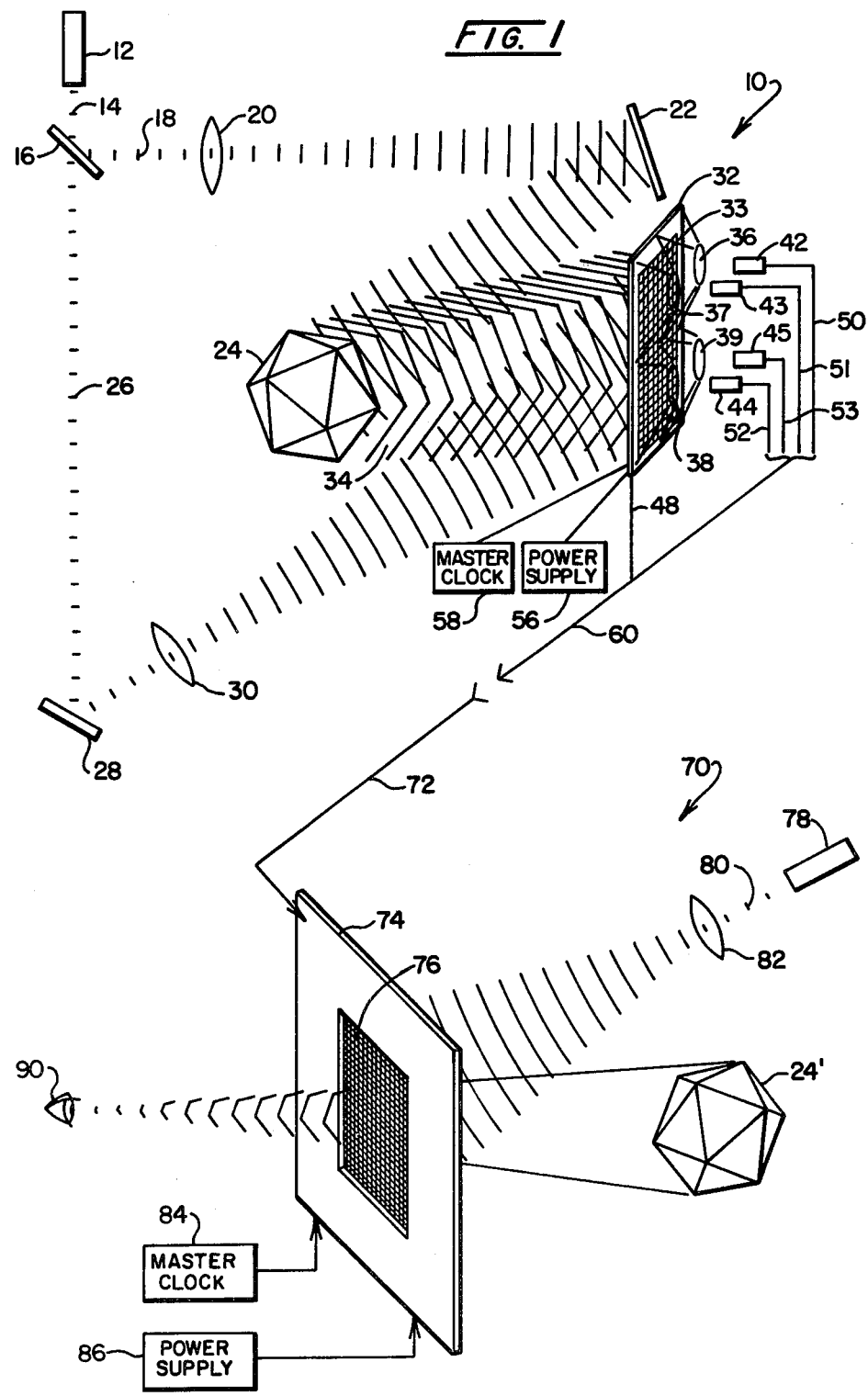

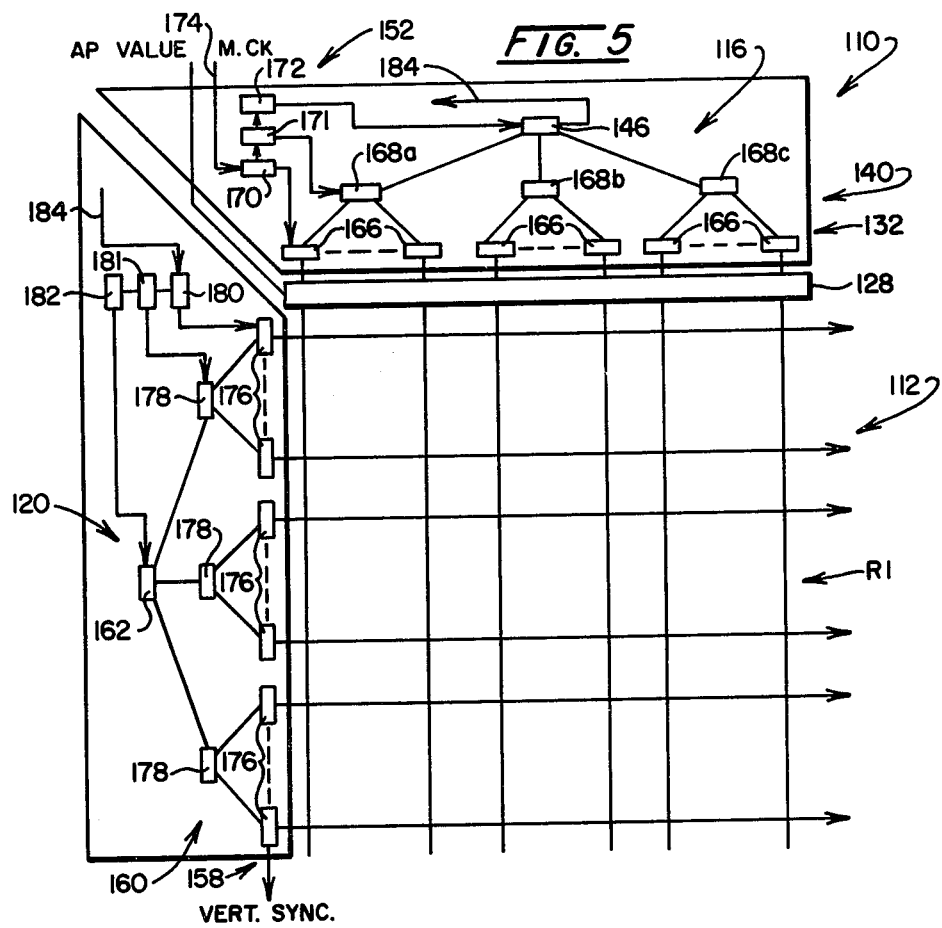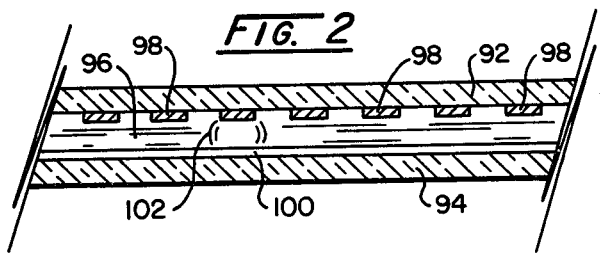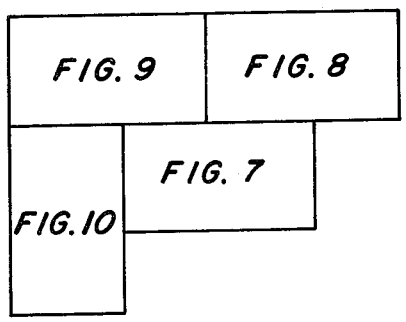

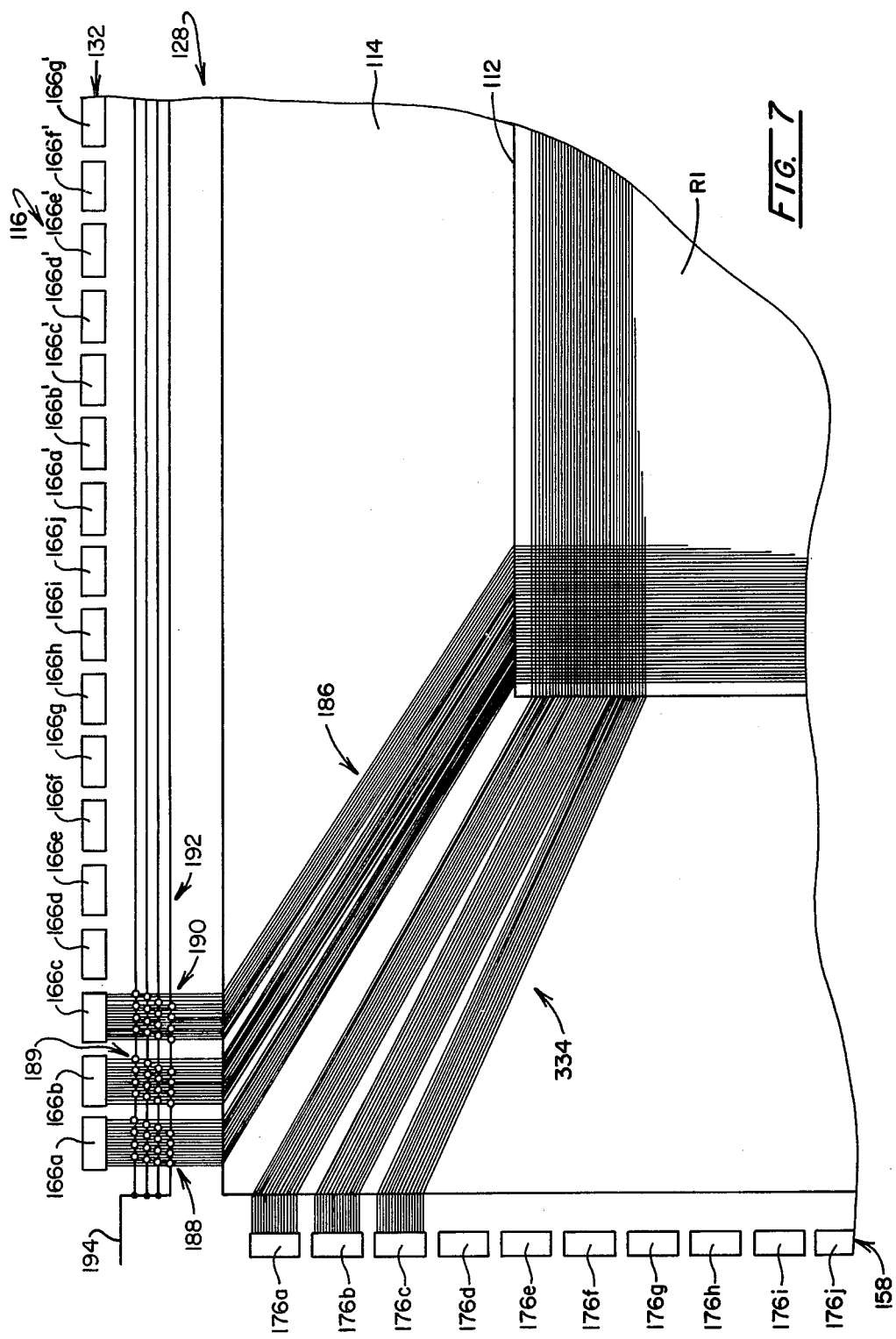

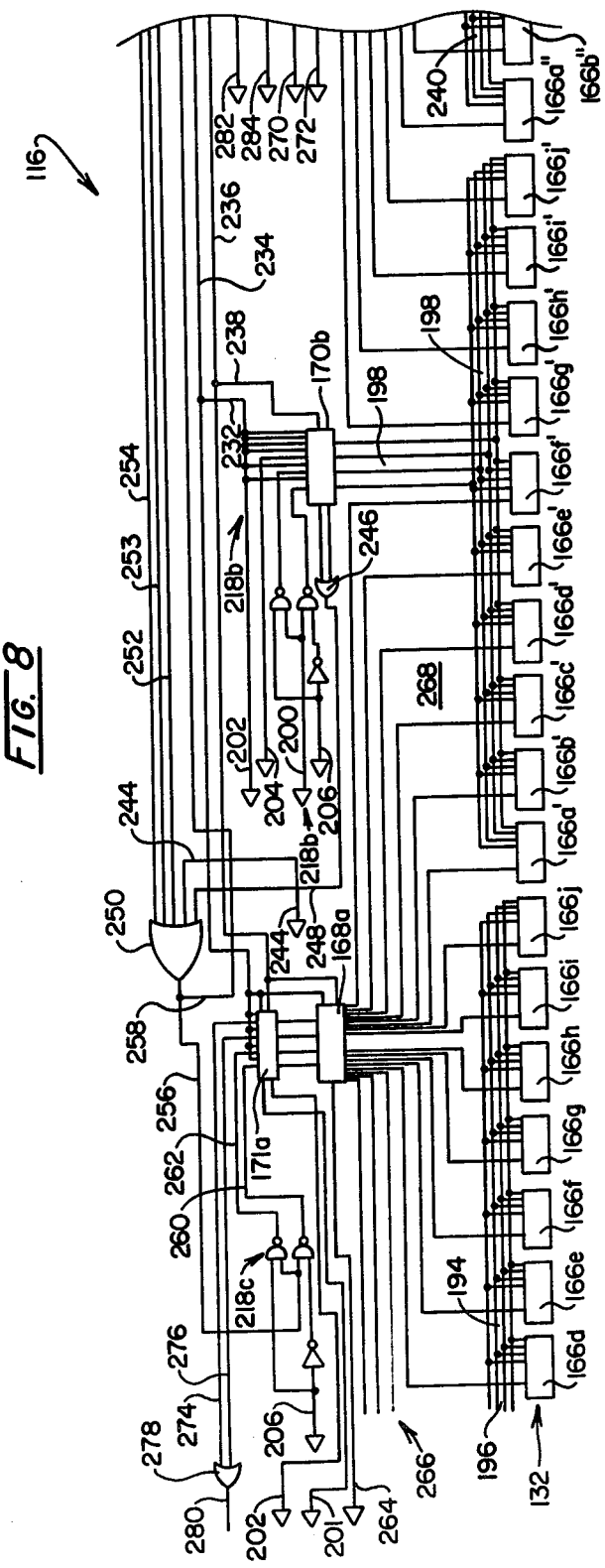

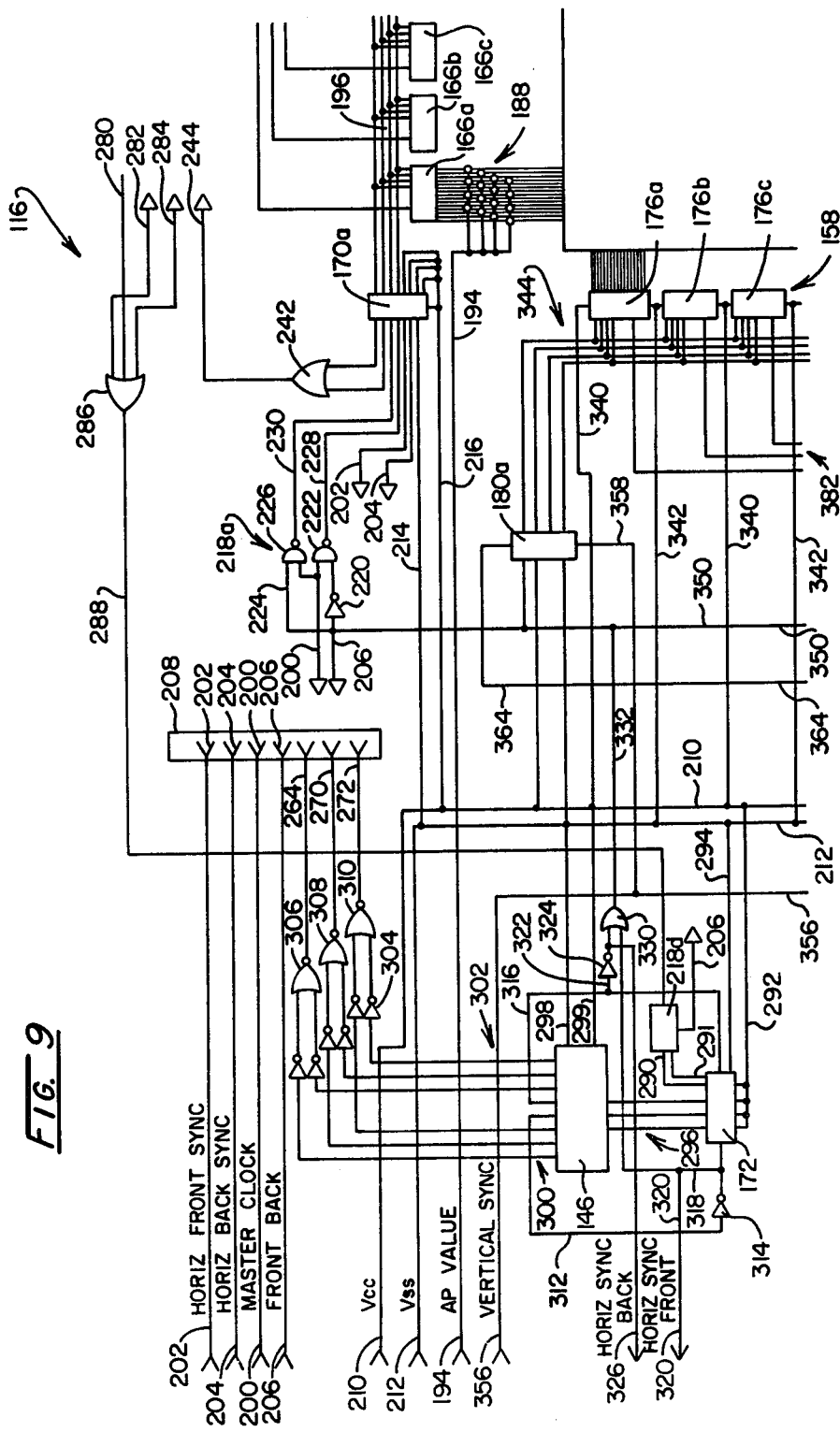

ELECTRONICALLY GENERATED HOLOGRAPHY

BACKGROUND

The development of the laser and related light stimulative technology has generated a significant interest on the part of investigators in that branch of interferometry known as holography. In its underlying concept, holography generally considers that the scattering pattern of light from an object is a transform, or coded record, of the features of that object. Where such a scattering pattern is stored, for example, photographically, an image of the object should be reconstructable. Prior to the availability of an intense coherent light source, a required recordation of such patterns proved most difficult. However, with the availability of the laser as an intense coherent light source and with an innovation wherein the scattering pattern was combined to interfere with a reference beam of coherent light, a photographic wave-front reconstruction was realized. With the interference of reference and reflective subject beams, resultant interference fringes exhibited a recordable contract representing a measure of amplitude of the subject beam and the position of these fringes represented a recordable measure of phase of the subject beam. Where a photograph of such an interference pattern is illuminated with a laser beam identical with the original reference beam, diffracted light from the photograph will have the same amplitude and phase characteristics as the original beam from the subject.

The most interesting aspect of the holographic reconstruction resides in the very detailed and three-dimensional nature of a resultant image. Additionally, holograms have been found useful in the evaluation of stress exerted upon structural components. The three-dimensional resolution of motion pitcure holograms has been found helpful in studying microscopic life such as plankton. Holographically produced lenses have found use in aircraft windshield displays, while holographic scanners are used in retail price code scanning assemblies.

For each of the above and other applications, the holographic information storage is photographic in nature and, thus, somewhat limiting in application. However, the relatively large amount of imaging data available in a holographic image record should find extensive application within a broad range of developing technologies. In particular, a significant extension of holographic applications will occur where such records become the subject of electronic storage. Further, where electronic wave-front reconstruction is available, an advantageous holographic imaging and transmission in real time may be achieved. However, many obstacles are posed before the investigator seeking to record holographic data electronically. Questions arise as to whether a form of electronic sampling at a holographic reception surface can achieve adequate image resolution, notwithstanding the apparent complexity of any sampling procedure itself. Assuming that such sampling is to be carried out within discrete sampling regions of minute area, then some form of electronic detection is required which responds accurately to the extent of wavefront interaction or the intensity thereof and the resultant datum then must be transmissible in conjunction with positional logic. Current and contemplated phototransistor structures do not appear to represent a logical approach to the detection, isolation and transmission of holographic wavefront interactions.

SUMMARY

The present invention is addressed to a system and associated apparatus wherein holographic data may be generated, recorded and/or transmitted as electrical signals for utilization in a broad variety of applications. In one such application, electronic holographic data with respect to an object is generated utilizing apparatus operating in a construction mode, which data then is tranmitted to a very similar apparatus operating in a reconstruction mode wherein virtual and real images of the object are generated under real time conditions.

A further feature and object of the invention is to provide a system for generating electric signals corresponding with a hoiographic representation of an object wherein a coherent source of light is utilized for illuminating an object and for providing a reference beam. An image receiving arrangement having receiving surface is oriented for receiving light reflecting from the illuminated object and, simultaneously from the reference beam to form an interference pattern. The receiving apparatus is formed having a matrix of predetermined, aperture defining locations at a receiving surface thereof, each of which is electrically addressable in a select scan sequence to effect generation of an electrical data signal of amplitude corresponding with the intensity of the light interference pattern at the addressed, aperture defining location. A control for the image receiving apparatus is provided which electrically addresses the matrix of the aperture defining locations in accordance with a select scan sequence and at a predetermined scanning rate. The control arrangement further provides a scanning synchronization signal and the data signals along with synchronization signals may be utilized for a wide variety of applications.

As a further object, the scan components may comprise a decoder arrangement having a plurality of selectively activated discrete outputs, each operatively associated with a discrete electrode of one array. A voltage source is provided as well as a plurality of discrete signal directors each coupled with a decoder discrete output, the operatively associated discrete electrode and the voltage source. The directors are responsive to select activation of the decoder to communicate the voltage source with the operatively associated discrete electrode to establish one of the electrical states generating the noted electrical field.

Another object of the invention is to provide apparatus for converting a holographic light interference pattern to electrical signals which includes two supports spaced a predetermined distance apart, the first of which supports formed having a transparent surface which is positionable to receive the holographic interference pattern. One array of parallel, transparent and electrically conductive electrodes is supported in a predetermined orientation on one of these supports, while another array of parallel, transparent and electrically conductive electrodes is supported upon the other in an orientation predetermined to define with the first array of electrodes a matrix of spaced electrode crossing locations. Positioned intermediate the two supports is a normally opaque medium, light transmissive in the presence of an applied electric field. A control is electrically coupled with the two electrode arrays for sampling the matrix of locations by generating an electrical field of predetermined value between sequentially selected pairs of electrodes within the noted arrays. A light responsive detecting arrangement is operatively associated with one support for deriving an electrical output signal corresponding with the light intensity of the interference pattern at a given sampled matrix location. The normally opaque medium may be present as a dipolar electrooptical one, for example, comprising a suspension of Herapathite dipoles.

As another aspect of the invention, the above-described control arrangement includes a scan arrangement for sequentially imposing a first electrical state of one polarity upon successive ones of a select plurality of electrodes of one array, while simultaneously imposing a second electrical state of opposite polarity upon a select one of the electrodes in the other array thereof. To achieve interference pattern intensity related signals at the light responsive detecting components, the noted electrical states are selected to establish a constant value electrical field at each of the crossing locations defining the matrix. Thus, aperture locations are developed of essentially constant effective diameter.

Another feature and object of the invention is to provide apparatus for generating a hologram in response to holographic data derived as a sequence of synchronizing and data signals, the data signals corresponding with the intensities of a light interference pattern generated by a source of coherent light of predetermined wavelength characteristic. The interference pattern is sampled in the scan of a matrix of uniform, discrete apertures adjacent the interference pattern. Two planar transparent supports, which are spaced a predetermined distance apart, are arranged such that the surface of one of the supports is positionable for receiving light from a coherent source thereof exhibiting the wavelength characteristics of the holographic data generating coherent source. A first array of parallel, transparent and electrically conductive electrodes is supported in a corresponding first orientation by the first transparent support, while a second array of parallel, transparent and electrically conductive electrodes is supported in a second predetermined orientation by the other transparent support to define with the first array of electrodes a matrix of spaced electrode crossing locations generally corresponding with the matrix of uniform discrete apertures utilized in the generation of the holographic data. A normally opague medium, light transmissive in the presence of an applied electrical field is positioned intermediate the transparent supports and a control arrangement is provided which is electrically coupled with each of the electrode arrays and which is responsive to the synchronizing and data signals for generating an electrical field of value corresponding with the data signals between electrodes of the two arrays at the crossing locations and in a sequence regulated by the synchronizing signals generated in the construction of the holographic data. In a preferred embodiment, the control arrangement comprises scan components for imposing electrical states of one polarity upon a select plurality of electrodes of one of the arrays in a sequence corresponding with the sampling scan of construction, while simultaneously imposing second electrical states of opposite polarity upon a select one of the electodes of the other array.

As another object of the invention, the scanning components may comprise a decoder arrangement having a plurality of selectively activated discrete outputs each operatively associated with a discrete electrode of one array. Further, a receiver is provided for receiving the data signals and having a voltage level output corresponding therewith and a plurality of discrete signal directors are each coupled with a decoder discrete output, the operatively associated discrete electrode and the receiver output is provided, these directors being responsive to select activation to communicate the voltage level output with the operatively associated discrete electrode to establish a noted first electrical state.

Another object of the invention is provide a system for constructing, transmitting and reconstructing holographs of an object wherein a coherent source of light of predetermined wavelength characteristic is provided to illuminate the object as well as to provide a reference beam. First and second substantially planar supports spaced a predeteremined distance apart are provided, the first support having a transparent receiving surface for receiving light reflecting from the illuminated object and, simultaneously from the reference beam to form an interference pattern. A first array of parallel, electrically conductive electrodes is supported in a first orientation by the first support, while a second array of parallel, electrically conductive electrodes having a second predetermined orientation is supported by the second support to define with the first array of electrodes a first matrix of spaced electrode crossing locations. A first normally opaque medium, light transmissive in the presence of an applied electrical field is positioned intermediate the first and second supports. A first control arrangement is provided which is electrically coupled with the first and second electrode arrays and serves to sequentially sample the matrix of locations defined thereby by generating an electrical field of predetermined value between sequentially selected pairs of electrodes of the first and second arrays and which provides a scanning synchronization signal. Light responsive detecting components are operatively associated with the second support for deriving an electrical data signal corresponding with the light intensity of the interference pattern at a sampled matrix location and an arrangement for conveying the scanning synchronization signals and data signals is provided. At a reconstruction location, third and fourth transparent supports spaced a predetemined distance apart are provided, the third surface being positionable for receiving light from a coherent source thereof of the predetermined wavelength characteristic used in holographic construction. A third array of parallel, electrically conductive electrodes is provided which is supported in a third predetermined orientation by the third support, while a fourth array of parallel, electrically conductive electrodes is supported in a fourth predetermined orientation by the fourth support to define with the third array of electrodes a second matrix of spaced electrode crossing locations geometrically corresponding with the first matrix. A second normally opaque medium, light transmissive in the presence of an applied electrical field is positioned intermediate the third and fourth transparent supports and a second control arrangement is provided which is electrically coupled with the third and fourth electrode arrays and which is responsive to conveyed scanning synchronization signals and data signals for generating an electrical field of value corresponding with the data signals between electrodes of the third and fourth arrays at the crossing locations in a sequence regulated by the synchronizing signals.

Other objects of the invention will, in part, be obvious and will, in part, appear hereinafter.

The invention, accordingly, comprises the apparatus and system possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a schematic, pictorial representation of the construction and reconstruction mode components of the system of the invention;

FIG. 2 is a schematic, enlarged and exaggerated sectional view of an imaging plate utilized with the instant invention;

FIG. 5 is a partial schematic representation of an imaging plate according to the invention showing electronic functions in enlarged detail with respect to FIG. 4;

FIG. 6 is a representation of the proper mutual orientation of FIGS. 7-10;

FIG. 7 is a schematic circuit diagram showing portions of the imaging plate of FIG. 5 at a higher level of detail;

FIG. 8 is a schematic circuit diagram showing portions of the imaging plate of FIG. 5 at a higher level of detail;

FIG. 9 is a schematic circuit diagram showing portions of the imaging plate of FIG. 5 at a higher level of detail.

DETAILED DESCRIPTION

Figure 3:
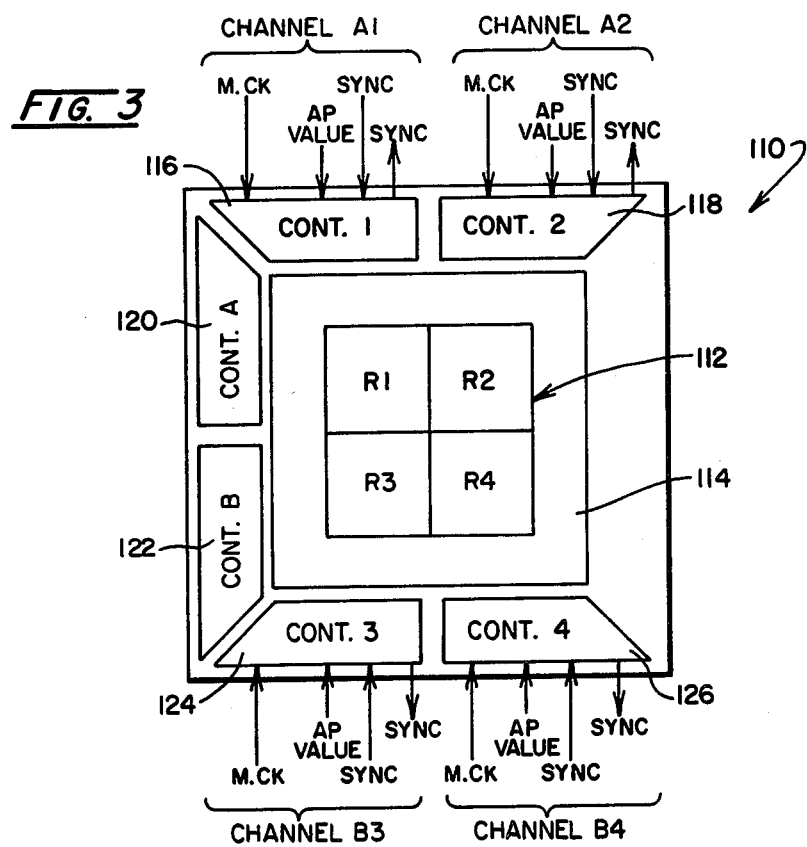
FIG. 3 is a schematic view of the face of an image plate according to the invention.

In the discourse to follow, a general description of the geometrical arrangement of a conventional holographic construction as applied to the instant invention is described in conjunction with the corresponding technique for reconstructing a virtual holographic image utilizing the technique of the invention. Following this introduction, a description of evaluations employing masking techniques to simulate the sampling approach of the invention is provided, following which, progressively more elaborate description with respect both to the structuring of an image plate matrix and the electronic logic associated therewith is set forth.

Referring to FIG. 1, a construction mode of the system of the invention is schematically portrayed at 10 wherein electronic signals are generated corresponding with a holographic representation of an object. In conventional fashion, a coherent source of light is provided by a laser 12, for example, having a light output at 6328 Angstrom units. Laser 12 provides a coherent light beam 14 which intercepts a beam splitter 16. Beam splitter 16 establishes one component of the light source as an object beam 18 which is expanded at a conventional positive power dispersion or expanding lens 20. The object beam then is reflected from mirror 22 to impinge upon and illuminate object 24. That component of beam 14 passing through beam splitter 16 serves as a reference beam 26 which is reflected from mirror 28 and expanded by a lens 30 to impinge upon the imaging region 33 of an imaging plate 32. Also impinging upon the imaging region of plate 32 is the illumination represented at 34 reflecting from object 24 in consequence of the impingement thereupon of beam 18. The light of reference beam 26 and reflected illumination 34 interfere at region 33 of imaging plate 32 and the resulting interference pattern, if recorded, forms a hologram. Imaging region 33 is configured to support a dipolar fluid in operable association with a matrix of mutually, orthogonally disposed and spaced transparent electrodes which, when appropriately electrically addressed, define transparent apertures or cells functioning somewhat as discrete pixels which, for the embodiment herein disclosed, are addressed to provide a succession of discrete transparent apertures of very small but consistent diameter. Apertures successively formed, for example having diameters of three microns spaced on 6 micron centers may be developed by the transparent electrode matrix. These apertures must be smaller than the spatial holographic information. Otherwise unacceptable data would be obtained. By appropriate address logic technique, holographic data at each of these apertures may be evaluated by optical and electronic components of the system. This address logic control also serves to evaluate the matrix of aperture defining locations within region 33 on a multi-channel basis. Multi-channel performance operating in conjunction with region 33 is important, inasmuch as to achieve adequate resolution of the image and three-dimensional data corresponding with the interference wavefront pattern, a formation of the noted very small and closely spaced aperture openings is required. Through resort to multiple channels and corresponding multiple regions of simultaneous sampling, necessary scan frequencies can be achieved practically. For example, region 33 may be simultaneously and synchronously evaluated in four quadrants, each representing a channel of information. Such an arrangement is shown in the instant drawings.

For each channel defining quadrant within region 33, a light collecting lens is provided at a position rearwardly thereof. Thus, four lenses, each associated with one of four channels are revealed at 36-39. Shown schematically positioned rearwardly of each lens 36-39 are respective light responsive elements or photocells 42-45. Thus, for each of the positions within the aperture defining matrix of imaging region 33, a synchronizing electrical signal representative of the position of that aperture is derived for transmission as represented schematically by line 48, and a synchronously developed value of the intensity of the interference pattern at that position is developed at an appropriate line 50-53 extending, respectively, from light responsive elements 42-45. Preferably, all of the sampling electronics carrying out the performance of imaging plate 32 is incorporated about the periphery thereof. In conventional fashion, however, a power supply as represented by block 56, and a master clock function input may be provided as represented at block 58. The data developed at lines 48 and 50-53 are multi-channel in nature and are constituted as an amplitude valuation of intensity along with corresponding matrix position information. Because of the above-described nature of the data development, such information may be transmitted in multi-channel fashion as serial data either to a recording medium or, for real time applications of the holographic system, as a serial data signal. Transmission of such data is represented at line 60.

The serially presented wavefront data at line 60 is directed to an arrangement of very similar components operating in a reconstruction mode revealed generally at 70. In this regard, the data are shown transmitted via line 72 to a reconstruction mode imaging plate 74. Reconstruction mode imaging plate 74 is structured substantially similar to imaging plate 32, and includes a matrix region of geometrically positioned light transmissible aperture defining locations developed in by transparent electrodes arranged in a predetermined orthogonal orientation. This region is represented at 76 in a position located to receive coherent light generated from a laser source 78. Angularly disposed with respect to the planar orientation of region 76, laser source 78 provides an output beam 80 of coherent light having a wavelength identical with that provided at laser 12. Beam 80 is expanded by a positive expanding lens 82 prior to its impingement upon region 76. As before, a master clock input is provided to the electronics of imaging plate 74 as represented at block 84, the pulse frequency output of master clock 84 being identical with that of master clock function 58. Similarly, a power supply as represented at block 86 is provided for the electronics at reconstruction imaging plate 74. When the data representing intensity and aperture position are decoded at plate 74, the individual apertures at each location within the multi-channel matrix at region 76 are opened in proportion to the light intensity or amplitude correspondingly observed by light responsive elements 42-45 within the construction mode component arrangement 10. Thus, as region 76 is operated upon in scanning fashion with these data, an eye station 90 may observe a virtual image of object 24 as at 24' through the matrix region 76. In the reconstruction mode the apertures defined within region 76 remain open for substantially a full frame scan. Correspondingly, those within construction mode region 33 exhibit rapid opening and closing characteristics. Source 78, identified in the figure as a laser, may be provided as a light source having a narrow spectral line width and a small source area.

Now considering the matrix regions 33 and 76 of respective imaging plates 32 and 74, in order to achieve requisite spatial frequencies in conjunction with adequately small, selectively transparent cells or apertures in accordance with the instant invention, a matrix of transparent, orthogonally disposed and spaced electrodes are utilized in conjunction with an electro-optical medium. This medium will be normally opaque to light transmission. However, when subject to an applied electric field, a transparent cell is developed within the medium, the geometric characteristics of which are correlatable with the strength of that applied field. One such medium, for example, is provided as a dipolar fluid formed of Herapathite dipoles which are submicron needle-like crystals of idoquinine sulfate. The optical transmissivity of this dipolar fluid is dependent upon the orientation of these crystals which, in turn, can be controlled by an electric field. In a randomly oriented state, the crystals render the fluid relatively non-transmissive, while oriented under the effect of an electric field, the state of the fluid becomes transparent. Concerning such fluids, the readers attention is directed to the following publication:

An X,Y Raster Utilizing a Dipolar Electro-Optical Medium by Marx, Proceedings of the S.I.D., Vol. 11/1, First Quarter 1970, pp. 2-5.

Looking additionally to FIG. 2, a schematic and non-scale representation of the structure of matrix regions 33 and 76 is revealed. Identical for each of the imaging plates 32 and 34, the structure includes two transparent plates 92 and 94 which comprise the principal surface components of a structure confining a dipolar fluid represented at 96. The mutually facing surfaces of plates 92 and 94 serve to support arrays of transparent linear electrodes certain of which are shown respectively at 98 and 100. These electrode arrays are orthogonally disposed with respect to each other to define a matrix of what appear as intersections of spaced apart electrodes. FIG. 2 further schematically illustrates the formation of a cell or aperture 102 as a result of creating an electric field at a unique intersection of one select transparent electrode 98 and one select electrode 100. The extent or effective diameter of aperture 102 corresponds with the value of this imposed field. Thus, in a construction mode as at 10, uniformly identical fields are generated for each aperture to achieve a valid intensity readout from an associated photoresponsive device 42-45. Conversely, in a reconstruction mode as at 70, the effective diameter of aperture 102 corresponds with the intensity value determined by associated photoresponsive device 42-45.

As indicated above, the fluid 96 selected for construction mode region 33 should exhibit rapid rise and fall characteristics in changing from an opaque to a transparent state. On the other hand, the fluid 96 chosen for reconstruction mode region 76 should exhibit a relatively lengthy dwell time when in a transparent state. This dwell interval should be sufficient such that all apertures are open for a full frame hologram definition.

Exemplary of techniques for developing the electrode array matrix is the use of indium oxide or indium-tin oxide as the electrode material. Development of the elongate thin electrodes may be by a photolithographic liftoff technique wherein the substrate is coated with a positive photoresist that is subsequently exposed to form the desired array pattern. The resist-coated substrate then is developed to generate a negative of the desired pattern. As a next step, for example, a 1,000 Angstrom unit thick indium oxide film is deposited on the substrate and the resist pattern. Following this deposition, the substrate is immersed in a resist solvent which removes the remaining resist and the overlaying indium oxide coating leaving an indium oxide pattern on the surface. The undercutting of the resist pattern allows the solvent to penetrate and dissolve the resist. The electrode pattern may be generated by recording in a thin photoresist layer an interference pattern created by two overlapping coherent light beams generated from a laser, for example, an argon ion laser. The line-pair spacing of the interference fringes corresponds to the desired electrode spacing and the fringe spacing may be adjusted by varying the angle between the two overlapping laser beams. This technique is capable of generating patterns with spacings ranging from ¼ micron to several microns over an area of several square centimeters. Alternatively, a masking technique may be used for structures with dimensions greater than approximately 1 micron.

Where, as indicated earlier, electrodes of 3 micron width with 6 micron line pair spacings are provided to occupy an area of one square centimeter, approximately 1,667 leads and contact pads are required per electrode pattern. Conventional photographic techniques can be utilized to generate the connecting leads in an appropriate fan-out pattern.

As is apparent, in dealing with the procedures of electronically sampling the matrices at regions 33 and 76 it may be expected that a loss of image resolution and development of background noise would be experienced. In addressing this initial expectation, a program was carried out to examine the effects of holographic image resolution and quality occasioned by the sampling of holographic information in the manner of instant invention. This examination employed a masking technique to simulate the sampling operation. With this technique, a mask was fabricated utilizing a photolithographic process wherein a matrix of very small transparent regions were formed therein. This mask then was joined with a sheet of high resolution photographic film and holographic information was recorded upon the film through the matrix of transparent openings in the mask. Thus the masking arrangement simulated the sampling operation described in connection with FIG. 1.

In carrying out the investigation, masks were fabricated with 0.5 micron openings on 1.0 micron centers and 1.9 micron openings on 3.1 micron centers. To fabricate the masks, an interference pattern was generated by two overlapping argon ion laser beams, the pattern being recorded on a medium constituted as a thin photoresist layer deposited on a chromium plated glass substrate. To generate a required dot pattern at the masks, two exposures with the sample rotate 90° between exposures were carried out. Following these exposures, the resist coded sample was developed and the exposed chromium layer acid etched to form a metallized pattern.

Holograms utilizing the mask were formed of an image object present as a USAF three-bar resolution chart. A high resolution emulsion (649-F) was exposed through the transparent openings of the mask which was clamped tightly against the noted emulsion.

Using the above-described procedures and the 1.9 micron mask, holograms of the target were produced with nominal holographic spacial frequencies of 333 lines/mm and a line pair spacing of 3 microns, 166 lines/mm, and a line pair spacing of 6 microns and 125 lines/mm with a line pair spacing of 8 microns. Holograms with nominal spacial frequencies of 500 lines/mm and a line spacing of 2 microns as well as 166 lines/mm and a line pair spacing of 6 microns were recorded with the 0.5 micron mask.

The above holograms were made with and without the mask, which may be considered a sampling mask, to provide a basis for a direct measurement of the resolution loss occurring in the sampled hologram. Image resolution was measured from photographs of the real image.

Such measurements showed that only a negligable loss of image resolution occurred in the holograms formed with the mask. The typical non-masked hologram exhibited a resolution of 16 lines/mm to 18 lines/mm while the sampling mask holograms made with the 1.9 micron mask displayed resolutions of 14 lines/mm to 16 lines/mm. Those holograms recorded through the 0.5 micron mask exhibited slightly lower resolution, approximately 14 lines/mm.

It was determined that increased noise and light scattering does not appear to be a significant problem with respect to the holograms formed with the masks. The only observable noise existed in the form of graininess and multiple images of the resolution target. The multiple images originated with defraction introduced by the sampling mask.

Thus, from the foregoing, it may be seen that the sampling approach to achieving the formation of an electronic recordation of holographic data represents an effective approach.

Turning now to the implementation of logic circuitry associated with the imaging plate 32 and reconstruction plate 74, as indicated earlier herein, these components may be identical in construction, the differences in their performance being predicted upon their use in either a construction or reconstruction mode. In the figures to follow, these imaging plates are described in progressively greater enhancement of detail and, inasmuch as they are somewhat symmetrical and of repetitional component orientation, the figures look to progressively smaller regions of their surfaces.

Looking to FIG. 3, an imaging plate which may be utilized in either a construction or reconstruction mode is represented generally at 110. Imaging plate 110 includes a centrally disposed rectangular matrix region 112. Region 112 is subdivided, for example, into quadrants R1 through R4 which are independent of each other but are mutually, synchronously controlled. Thus, each of these quadrants serves to somewhat independently provide a channel of data. Matrix region 112 is immediately surrounded by a fan-out area 114 representing a portion of the support structure of plate 110 and which carries minute conductors from control electronics to the electrodes of the matrix region quadrants R1-R4.

To simplify the description of the electronics as is associated with the orthogonally disposed and spaced electrodes of the region 112 quadrants, these arrays of electrodes are referred to herein as "vertical" or "horizontal" in the sense of the drawings. Thus, the vertical electrodes of region quadrant R1 are individually coupled with and under the control of electronics positioned at 116 and labeled CONTROL 1. In similar fashion, the electronics associated with the vertical electrodes of quadrant R2 are controlled from electronic region 118 which is labeled CONTROL 2. The corresponding horizontal array of electrodes within quadrants R1 and R2 of matrix region 112 are controlled from control electronics within region 120 labeled CONTROL A and the horizontally disposed array of electrodes for quadrants R3 and R4 are controlled from electronics within region 122 labeled CONTROL B. Finally, the vertical electrodes within quadrant R3 of matrix region 112 are controlled by electronics within region 124 labeled CONTROL 3, while the corresponding vertical array of electrodes within quadrant R4 are controlled by electronics within region 126, labeled CONTROL 4.

Four channels of holographic data are simultaneously generated in synchronism from each of the quadrants R1-R4 and this positional as well as intensity related information is provided along outputs shown within the labeled channel designations A1-A2 and B3-B4. In this regard, note that each of the channels includes a master clock input (M. CLK.), an aperture value input (A.P. VALUE), as well as synchronizing inputs and outputs (SYNC.). The master clock input for each channel is a selected but identical frequency input and will be the same for both construction and reconstruction modes.

Synchronous inputs and outputs are provided respectively for the reconstruction and construction modes of operation, while the aperture value inputs will be of a predetermined constant voltage for construction mode performance and will vary in determination of individual intensities as evolved from photodetectors 42-45 for the reconstruction mode of performance. Generally, to provide enhanced response times for the region 112, a d.c. voltage level is continuously asserted over the electrode arrays thereof. The level of this d.c. voltage is selected such that the threshold of the operational characteristic of the dipolar fluid is reached. For example, this may cause a very small diameter opening to occur, eg. about 1800 Angstrom units, a value found acceptable where lasers, having significantly larger wavelengths, eg. 632.8 nanometers are employed with the system.

Figure 4:
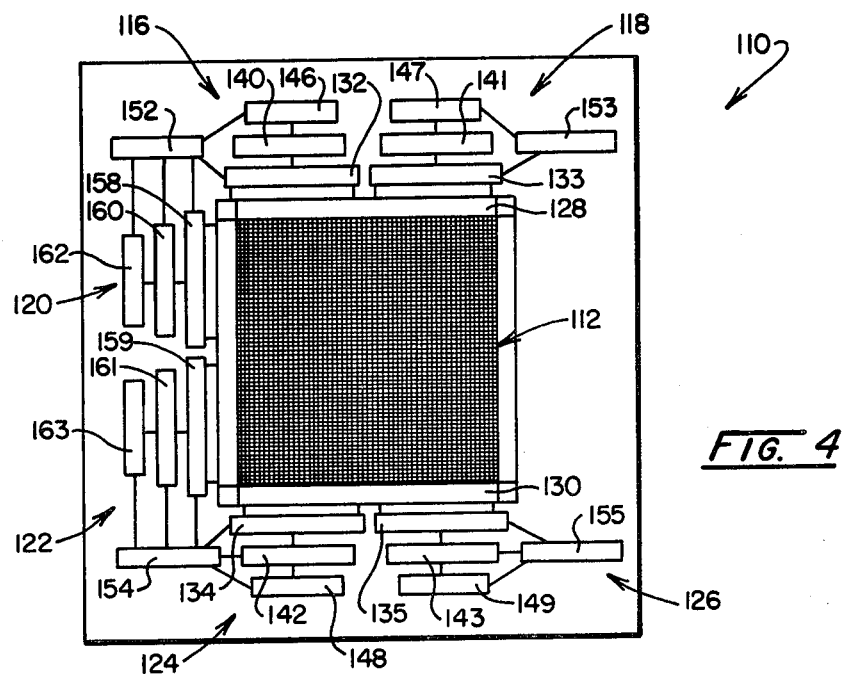
FIG. 4 is a schematic view of an imaging plate according to the invention showing electronic functions in general block fashion.

Imaging plate 110 again is presented in FIG. 4, however, in a revised descriptive aspect. Here, the orthogonally disposed arrays of electrodes within imaging region 112 are displayed in an exaggerated grid fashion, while the fan-out region for conductor interconnection between plate mounted electronics and the arrayed electrodes are not shown. Channel designated electronics are represented in the figure with the same general designation as provided in FIG. 3. In this regard, the vertical electrode electronic logic is identical for each channel and is again represented in general at 116, 118, 124 and 126. Similarly, the horizontal electronic logic for the horizonal array of electrodes are represented generally at 120 and 122.

Each of the vertical electrodes within the electrode arrays of all quadrants are R1-R4 of region 112 is coupled with a signal directing arrangement such as a differential amplifier represented in the drawing by blocks 128 and 130. The individual differential amplifiers represented by the blocks, when operating in a construction mode, receive as one differential input A signal of constant voltage value which serves to open the cell or aperture as described at 102 in connection with FIG. 2 to a constant or consistent diametric value. This assures as each horizontal and vertical electrode intersection is addressed by the system. Such control permits the value of light transmitted through the apertures and detected by photodetectors 42-45 to be converted to an analog value of wavefront interaction. The particular vertical electrode is selectively sampled or addressed by imposing an appropriate signal at a second input to the discrete differential amplifier coupled therewith. As is apparent, a significant number of such amplifiers are provided with the system. For example, where a vertical electrode spatial frequence of 1536 lines per centimeter is provided and each quadrant R1-R4 is provided having a half centimeter width, then 768 lines must be accommodated by that many differential amplifiers. It should be understood that signal treating components other than differential amplifiers may be provided for the instant purpose, the generation of a signal responsive inter-electrode electric field being the criteria for adequate performance.

In a reconstruction mode, the differential amplifiers at blocks 128 and 130 do not receive a constant voltage signal other than that required for developing threshold operational characteristics of the dipolar fluid. In this decoding mode, the amplifiers receive the outputs of photoresponsive devices 42-45 which vary in accordance with the detected intensity of wavefront interaction. Thus, the effective diameter of each transmitting cell or aperture 102 (FIG. 2) varies in accordance with the sampling valuation of the photodetectors and, as the electrode arrays within quadrants R1-R4 of region 112 are scanned, the wavefront interactions developed at imaging plate 32 in the course of a construction mode operation simultaneously may be reproduced within the active region 76 of reconstruction imaging plate 74 (FIG. 1).

Looking to the matrix region 112 sampling or addressing procedure, each of the differential amplifiers within blocks 128 and 130 is addressed by a first tier decoder function. In this regard, the decoder function for region 116 is represented by block 132, while that region 118 is represented by block 133. In similar fashion, the first tier decoding function within electronics region 124 is represented at block 134, while that at region 126 is represented by block 135. For the vertical electrode density or spatial frequency described above, for each quadrant, the equivalent of forty-eight 4 line to 16 line decoders functioning in the manner, for example, as type 74154, may be utilized for the purpose of first tier decoding as at 132-135. The decoders within blocks 132-135, in turn, are addressed by a second tier of decoders represented, respectively, by function blocks 140-143. For the electrode density described, each of the decoder function represented at blocks 140-143 would be provided as three, 4 line to 16 line decoders, the outputs thereof serving a chip enable function with respect to the associated first tier decoders represented at blocks 132-135. Second tier decoders 140-143, in turn, are addressed or selectively enabled by third tier decoders respectively represented by blocks 146-149.

All of the decoder functions are driven by counter functions. In this regard, the decoders within electronics region 116 are driven by a counter function represented at block 152, the decoding functions within region 118 are driven by a counter function represented by block 153, those decoder functions within electronics region 124 are driven by a counter function represented by block 154 and the decoder functions within electronics region 126 are shown driven by a counter function at block 155. Counter functions 152-155, in turn, are coupled to respond to master clock inputs as labeled in conjunction with FIG. 3. Additionally, the counter functions 152-155, where appropriate, perform in conjunction with synchronizing inputs and function to provide synchronizing output signals as labeled in conjunction with FIG. 3 and discussed in detail later herein.

Horizontal scanning or sampling is carried out by logic electroncis within electronic regions 120 and 122. With the exception of the absence of the earlier-described differential amplification functions, the control logic provided within these regions is substantially identical to that represented at regions 116, 118, 124 and 126. Looking to the figure, horizontal electrode control is provided by a first tier decoder function represented by block 158 which is electrically associated with horizontal electrodes within quadrants R1 and R2 of region 112. Similarly, the horizontally disposed electrodes within quadrants R3 and R4 are addressed or controlled by a decoder function represented by block 159. As before, for the electrode density or spatial frequency described above, each of the decoder functions represented by blocks 158 and 159 contain forty-eight 4 line to 16 line decoders. Decoder functions 158-159, in turn, are enabled or addressed from second tier decoder functions represented, respectively, at blocks 160 and 161.

For the electrode geometry and density discussed above, three, 4 line to 6 line decoders are provided with respect to each first tier decoder function 158 and 159. The second tier decoder functions represented at blocks 160 and 161, in turn, are controlled by third tier decoder functions represented respectively at blocks 162 and 163. The decoder functions represented by these blocks carry out an enablement function with respect to the decoding function represented at blocks 160 and 161. Counter drive to decoder functions 158, 160 and 162 is represented as being provided by the counting function at block 152, while the corresponding counter drive to decoder functions represented at blocks 159, 161 and 163 is shown being provided by the counter function at block 154. As is apparent, such counter inputs may be provided separately or in common depending upon design characteristics desired.

Referring to FIG. 5, an enlarged schematic and exaggerated representation of quadrant R1 of matrix region 112 is represented in conjunction with associated electronics regions 116 and 120. Looking to region 116, it may be observed that the differential amplification function remains represented by block 128, while first tier decoder function 132 is represented by blocks 166 in association with dashed lines indicating the presence of 48 such blocks. For the vertical electrode frequency or density discussed above, forty-eight such blocks utilizing four line of 16 line decoding provides for control over 768 electrodes within quadrant R1. Each of the lines extending from blocks 166 and through the differential amplification stages at block 128 represents connection with 16 vertical electrodes. Second tier decoder function 140 is represented by three blocks 168a–168c, each such block representing a 4 line to 16 line decoder function. As indicated earlier herein, the 16 line output of blocks 168a–168c serves to selectively enable blocks 166 in a mode-dependent regular sequence. Blocks 168a–168c, in turn, are sequentially enabled from the decoder function represented by block 146. The counter function described in conjunction with FIG. 4 at block 152, now is represented by three cascade connected blocks 170–172, the initial one, 170 of which is addressed by an externally generated master clock input at line 174.

In similar fashion, first tier decoder function 158 within electronics region 120 is represented by blocks 176, each representing a 4 line to 16 line decoder function. For the horizontal electrode spatial frequency or density described above, forty-eight such blocks 176 are present within electronics region 120. The lines extending from each of these blocks represent an association with 16 horizontal electrodes. Blocks 176, in turn, are sequentially enabled by second tier decoder function 160 represented by blocks 178a–178c and constituted as three 4 line to 16 line decoders. These decoders 178a–178c, in turn, are selectively enabled by decoder 162. Decoders 176, 178 and 162 are respectively driven by cascade connected counters represented at blocks 180–182 the initial one, 180 of which is driven from a form of horizontal synchronizing pulse generated in the course of operation of decoder 146 as represented at line 184.

Referring to FIG. 6, the proper mutual orientation of FIGS. 7–10 is revealed for purposes of considering these drawings jointly in connection with the ensuing discussion.

Referring to FIGS. 7–9 arranged as represented in FIG. 6, a portion of region R1 and associated electronic regions 116 and 120 is revealed in enlarged and exaggerated detail. FIG. 7 shows a small component of imaging region 112 positioned in adjacency with fan-out area 114. An array of fine, elongate conductors is represented at 186 extending from connection with corresponding vertical electrodes within region 112 to connection with discrete differential amplifiers identified as circles within groupings thereof 188–190. Only three such groupings of the differential amplifiers and elongate conductors are illustrated in the interest of clarity. In correspondence with FIG. 4, the differential amplifier grouping also is revealed generally by numeral 128. The individual differential amplifiers within groupings 188–190, for each channel and for the instant embodiment, channel A1, are coupled through common 4 line conductor array 192 and receiving line 194 to receive the earlier-described aperture value signal. In a construction mode, this signal is a predetermined constant level of voltage selected for deriving a consistent diameter matrix cell or aperture opening. On the other hand, in a reconstruction mode, the signal value at line 194 varies in accordance with the output of an appropriate channel photodetector 42–45. The opposite input to the differential amplifiers described generally at 128 derives from connection with appropriate outputs of 4 line to 6 line decoders represented generally at 132. As represented earlier herein, for the instant embodiment, 48 such decoders are provided per quadrant to establish 768 vertical electrode control positions. In keeping with the numeration set forth in FIG. 5, the 4 line to 16 line decoders arrayed at 132 are identified in successive sequences of 10 thereof, commencing with the left side of electronics region 116. This identification is alphanumeric, the sequence of each 10 decoders being labeled 166a–166j. Conductor arrays as shown at 186 as well as differential amplifier groupings as described at 188–190 are deleted from the drawing commencing with the initial decoder 166d in the interest of clarity. However, it should be understood that like connections are provided with differential amplification stages and conductors within the entire electronics region 116 as well as with each such region 116, 118, 124 and 126.

The forty-eight decoders at 132 are driven by a coordinated grouping of five synchronous 4-bit binary counters, the initial two of which are identified in FIG. 9 at 170a and FIG. 8 at 170b. The 4 line array output of counter 170a is represented at line array 196 extending to an initial sequence (left to right) of ten decoders 132 identified at 166a–166j. This sequence of decoders 132 continues with the same numeration but successively primed, under the drive of the second identified 4-bit synchronous counter 170b. In this regard, the output of counter 170b is shown extending to decoders 166′a–166′j of the next decade sequence thereof at line array 198.

Looking to the control aspects of the counting function, and recalling the general geometry of the system for construction mode 10 and reconstruction mode 70, it may be observed that, for a right to left scan performance in the course of construction, a corresponding left to right scan will be required for reconstructing the thus constructed wavefront. Without such an arrangement, a left-right reversal would occur in imaging.

FIG. 9 reveals that the master clock input to the system, whether operating in construction or reconstruction mode is provided at a line 200, while the indication as to whether the required scan is from left to right or right to left is indicated by the corresponding designation "FRONT/BACK" as represented at input line 206. Similarly, the horizontal synchronizing input for the "FRONT" (construction) performance is provided at line 202, while the corresponding horizontal synchronizing input for the "BACK" or reconstruction performance of the system is provided at input line 204. These lines extend from sources external to the apparatus to a block position 208. Block 208 indicates that those lines terminating therein extend to other identically numerated lines elsewhere in the circuit drawing, the arrangement being made in the interest of drawing clarity. Additional external inputs of immediate interest are line 210 carrying operational level voltage, $V_{cc}$, and line 212 carrying the corresponding ground level logic input, $V_{ss}$.

Counter 170a is seen to be conventionally coupled to ground level through lines 212 and 214 and to plus voltage supply from lines 210 and 216. Counter 170a as well as all five counters within the first tier counting function 170 are driven from the master clock input at line 200. This clock input is coordinated with a signal representing an appropriate left to right or right to left scan performance requirement as generated by a signal at line 206. In this regard, when the signal level at line 206 represents a logic high, then a left to right scanning or sampling performance is carried out, while the opposite or logic low signal generates a corresponding right to left performance of scan. The logic for causing counters as at 170a to perform for these two modes of operation is provided by double gating NAND function networks as are positioned adjacent counters 170a and 170b and represented generally at 218 with an appropriate alphabetical suffix. It should be understood that such networks as at 218 are associated with each counter function within electronic circuit regions 116, 118, 124 and 126 and described, specifically, in FIG. 5 in conjunction with blocks 170, 171 and 172 for electronic control region 116.

Looking to FIG. 9, network 218a is seen to receive the front/back input of line 206 as well as the master clock input from line 200. Line 206 is shown to be coupled through an inverter 220 to NAND gate 222, and through line 224 to one input of another NAND gate 226. This front/back signal is applied in conjunction with the master clock input at line 200 which is directed to the opposite inputs of gates 222 and 226. The outputs of NAND gates 222 and 226 are presented along respective lines 228 and 230 to the up and down inputs of counter 170a. Thus, depending upon the logic level at line 206, counter 170a is preloaded or reset to 0 for an up count function. For synchronization purposes, the horizontal front sync input as well as the horizontal back sync input shown respectively at lines 202 and 204 are fed respectively to the load and clear input terminals of counter 170a. Thus, synchronizing inputs are provided which reset the operation of the counters either in the front or back (construction or reconstruction) mode of operation. Comparing the function of counter 170a with a conventional type 74C193 counter, the programmable four terminal inputs are all tied to a high logic value from lines 210 and 216 to provide for down count loading, while a clear input provides for a logic level 0 for front mode (left to right) performance. All counters within the system are operated in synchronism inasmuch as they are fed from the same master clock input at line 200. Further, all of the decoders as aligned at 132 are fed identical addresses during any instant of operation. However, these decoders will be seen to be enabled in appropriate succession from left to right or right to left.

Looking additionally to FIG. 8, counter 170b is seen to be operationally associated with an identical network 218b, the positive voltage input thereto, $V_{cc}$, being supplied from along line 232 to the down count load input, line 232 being coupled with distribution line 234. The ground or logic low input to counter 170b severally is provided from lines 236 and 238. Lines 234 and 236 extend to supply their function to the remaining control components within electronics region 116. It may be observed in FIG. 8 that the four line array output 198 of counter 170b extends to the corresponding 4-bit inputs of the second decade of decoders 166'a–166'j, while the next two decoders 166"a and 166"b of the next succeeding decade of decoders are shown fed by line array 240 extending from a next succeeding counter (not shown) within counter function 170 (FIG. 5).

Looking again to counter 170a in FIG. 9, it may be observed that the carry and borrow terminals thereof are coupled to corresponding inputs of an OR gate 242, the output of which is provided at line 244. In similar fashion, in FIG. 8, the corresponding carry and borrow outputs of counter 170b are coupled to the inputs of OR gate 246 which, in turn, has an output at line 248 extending to one input of a 5 input OR gate 250. A second input to gate 250 is provided from line 244 shown continued from FIG. 9 to FIG. 8. The remaining inputs to OR gate 250 at lines 252–254 emanate from the same terminals or outputs of the remaining three counters within function 170 and electronics region 116.

All inputs to gate 250 as presented from lines 244, 248 and 252–254 normally should be in mutual synchronism, inasmuch as all are activated at the same instant of time. By mutually tying these inputs of all 5 counters within counter function 170 through an OR function 250, a "fail-safe" operation ensues, inasmuch as if one counter shuts down the outputs of the other four are available for back-up purposes.

The output of OR gate 250 at lines 256 and 258 may serve both a synchronization function as well as a clocking function for the next tier of counters. In this regard, output line 256 from gate 250 extends to one input of double NAND gate network 218c. Structured identically with networks 218a and 218b, the opposite input to the network emanates from line 206, the logic level of which determines whether a front or back scanning performance is at hand. The output of network 218c is provided at line 260 for up counting purposes and at line 262 for down counting purposes and is directed to the corresponding inputs of counter 171a. Counter 171a functions as described in connection with FIG. 5 at 171 as associated with decoder 168a. In this regard, the counter represents a 4-bit binary counting function, the four line output of which is coupled to the input of a 4 line to 16 line decoder 168a. Both counters 171a and decoder 168a are supplied ground and plus power from respective lines 236 and 234. When enabled from along line 264, decoder 168a provides sequential outputs to the enable inputs of decoders arrayed at 132. In this regard, an array of eight enabling lines 266 extends to the chip enable inputs of decoders 166a–166h, while eight line array 268 extends from decoder 168 to the next sequential eight decoders 166i, 166j and 166a–166f.

As indicated in connection with FIG. 5, decoder 168a represents the initial decoder of a second tier grouping of three identified at 168a–168c within electronics region 116. These decoders are driven from counter functions comparable to that described at 171a which, in turn, are clocked from line 258 extending from the output line 256 of five input OR gate 250.

In similar fashion, as represented in FIG. 5, decoders 168b and 168c provide the remaining required sequential enablement of decoders 132 within electronics region 116. While such decoders are not represented in the drawing in the interest of clarity, their enablement from decoder 146 in appropriate sequence with decoder 168a emanates from along lines 270 and 272.

The carry and borrow outputs of counter 171a are present respectively at lines 274 and 276 and extend to the inputs of an OR gate 278, the output of which is povided at line 280. Correspondingly, combined carry and borrow outputs from the remaining second tier counters 171 within electronics region 116 are provided along lines 282 and 284. Looking particularly to FIG. 9, lines 280, 282 and 284 are seen to be directed to the input of a three input OR gate 286, the output of which is provided at line 288. The signals at line 288 serve as the clock input to third tier, 3-bit synchrous, programmable, bi-directional non-ripple counter 172. In this regard, line 288 is directed to one input of a dual NAND gate network represented by block 218d, the opposite input to which at line 206 carries the front-/back logic level information. Network 218d is structured identically and performs the same function as networks 218a-218c. The output of network 218d is directed along lines 290 and 291 to the up and down drive inputs of counter 172. Programmable inputs of counter 172 are coupled with positive power supply 210 and logic ground is supplied thereto by connection through lines 294 and 212. The three line binary output of counter 172 is provided at line array 296 which, in turn, is directed to the input of a 3 line to 8 line demultiplexer 146. Demultiplexer 146, as described in connection with FIG. 5, represents a third tier decoding function and serves to provide sequential chip enable inputs to second tier decodes 168a-168c. Coupled with ground input line 212 through line 298, demultiplexer 146 receives positive power supply line 210 through line 299.

Depending upon a construction or reconstruction (front/back) mode of operation, a counting sequence will be presented along line array 296 to demultiplexer 146 such that, for front mode operation, the outputs within four line array 300 are sequentially activated, and for the opposite or back mode of operation, the outputs within four line array 302 are activated in a reverse sense. One each of the lines within arrays 300 and 302 are directed through a corresponding inverter within grouping 304 thereof to an input of one OR gate of the grouping thereof represented at 306, 308 and 310. The outputs of these OR gates are present as the earlier-described enabling lines identified respectively at 264, 270 and 272.

With the arrangement thus shown, line 312 of array 300 will carry a signal representing a form of carry bit which is directed through an inverter 314 to the clear input terminal of bi-directional counter 172. Correspondingly, line 316 represents the carry bit of line array 302 and is directed to the load input terminal of counter 172. Thus, for either front or back mode operation, a form of reset is achieved for the system. With the arrangement, the output of inverter 314 may be tapped as by lines 318 and 320 to provide a horizontal synchronization signal for front mode operation (HORIZ. SYNC). Similarly, line 316 may be tapped by line 322 containing inverter 324 to provide at the output thereof and at line 326 at horizontal synchronization signal for reconstruction or back mode performance (BACK HORIZ. SYNC). The horizontal synchronization signals for construction or reconstruction modes are combined at OR gate 330 to provide a clock signal for the vertical logic circuitry at line 332. Line 332 will be seen to correspond with line 184 described in connection with FIG. 5 which, in turn, leads to counter function 180.

As described in connection with FIG. 5, counter function 180 serves to drive a first tier of decoders represented generally at 158 and by blocks 176. These decoders 176, in turn, serve to provide the control logic associated with transparent electrodes as at 100 which may be considered horizontally disposed with respect to the vertically disposed electrodes discussed in conjunction with the electronics of region 116. The horizontally disposed transparent electrodes are addressed by the logic circuitry in a sequence represented by the completion of simultaneous scanning by electronic regions 116 and 118 as well as by electronic regions 124 and 126 operating in conjunction with region 122. As before, the first tier of decoders 158 are identified in the sequence of their enablement from top to bottom as 176a-176j followed by a continuing sequence of 16 decoders 176'a-176'j, and so forth, the succession continuing for the embodiment described for 768 transparent horizontal electrodes. Returning momentarily to FIG. 7, it may be observed that the first tier of decoders at 158 are coupled with the horizontally disposed transparent electrodes within imagining region 112 or quadrant R1 by elongate thin conductors formed upon fan-out region 114. Arrays of these conductors extending from decoders 176a-176c are represented generally at 334. Similar such arrays of conductors extending from the remaining first tier decoders are omitted from the figure in the interest of clarity.

Returning to FIGS. 9 and 10, the decoders represented generally at 158 are provided as a 4 line to 16 line variety which are coupled to positive power supply line 210 and logic ground line 212, respectively, through lines 340 and 342. Decoder sequences 176a-176j are simultaneously driven from four line array 344 extending from the first of five first tier counters 180a (FIG. 9). In similar fashion, 4 to 16 line decoder sequence 176'a-176'j is driven from 4 line array 346 extending from the output of a counter 180b (FIG. 10), while a four line array 348 extending from 4 bit counter 348 drives a sequence of ten 4 line to 16 line decoders, the initial ones of which are represented at 176"a-176"c. As indicated above, for the electronics region 120, five counters as are generally designated at 180 are utilized to provide drive for a corresponding 48 decoders 158 for the embodiment described.

All of the counters within the sequence thereof generally represented at 180 are driven by the horizontal synchronization signal at line 332 which extends to line 350 which, in turn, feeds the clock input terminals of all of the counters 180. In this regard, note that line 352 couples line 350 with the clock input terminal of counter 180b, while line 354 couples the clock input terminal of counter 180c with line 350.

The clear terminal of each of the counters generally designated 180 is coupled with a vertical synchronizing input line shown in FIG. 9 at 356 the signal upon which is generated externally of the circuitry. Line 356 receives a pulsed input when the circuit is operated in a reconstruction mode only. Line 356 is coupled through line 358 to the clear terminal of counter 180a and, looking to FIG. 10, it may be observed that the clear terminal of counter 180b is coupled to line 356 through line 360, while the clear terminal of counter 180c is coupled to line 356 through line 362. Thus, during reconstruction mode operation, vertical synchronization of the principal counting function is provided.

Figure 10:
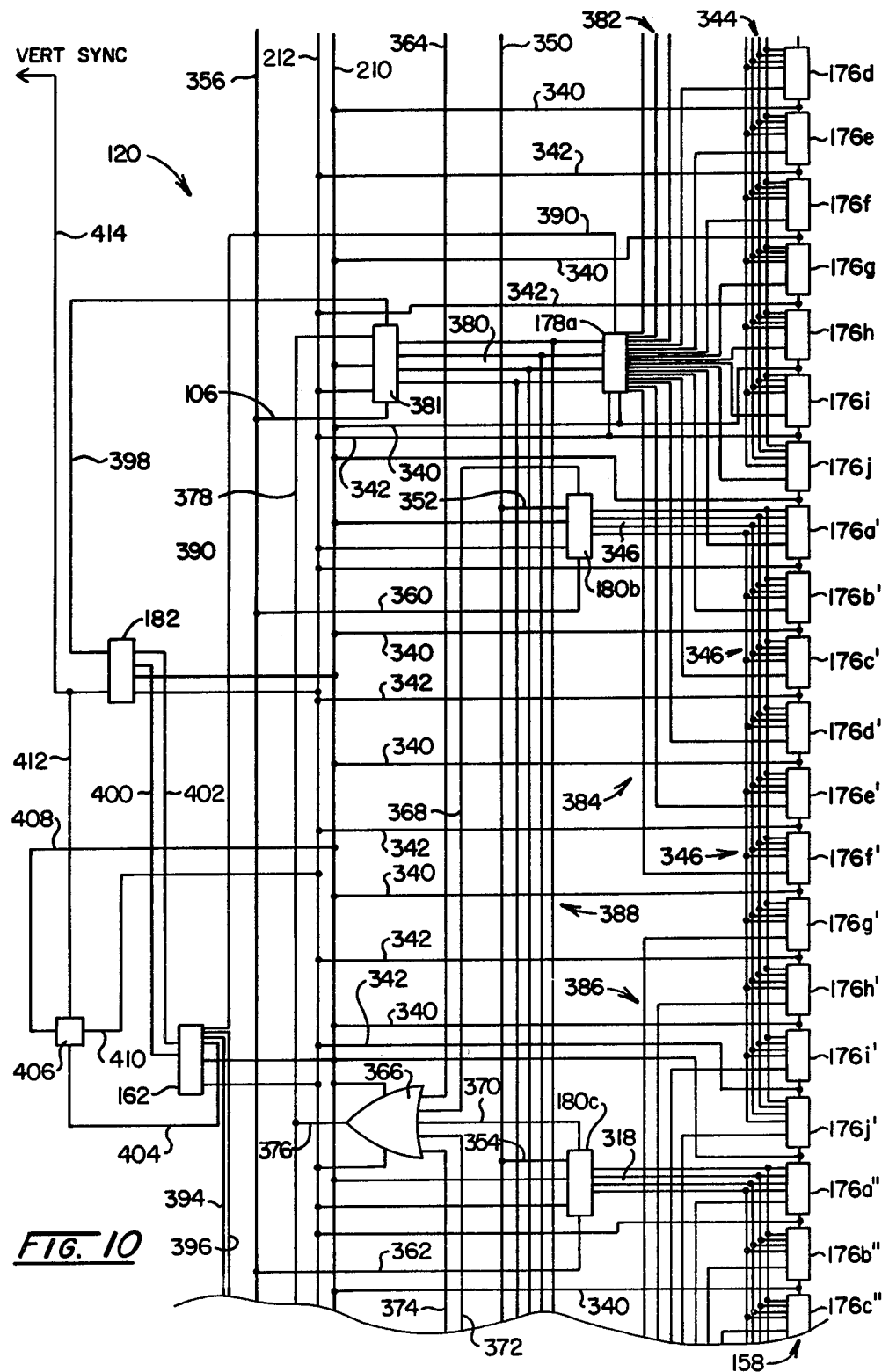
FIG. 10 is a schematic circuit diagram showing portions of the imaging plate of FIG. 5 at a higher level of detail.

FIG. 9 shows that the carry output of counter 180a is conveyed via line 364 to one input of a five input OR gate shown in FIG. 10 at 366. OR gate 366 receives the corresponding carry output of counter 180b from along line 368, the carry output signal of counter 180c from line 370 and the carry outputs of the remaining counters of general designation 180 (not shown) from along lines 372 and 374. Inasmuch as all of these counters generally designated 180 are driven simultaneously, the commonly ORed carry outputs thereof presented at line 376 provide a desirable redundancy establishing a next tier clocking signal which is introduced to line 378. Line 378, in turn, provides the clock input to a second tier counting function represented at 4-bit binary counter 181. The 4 line array output of counter 181 is represented generally at 380 extending to the input of a 4 line to 16 line decoder 178a, such decoder being the initial one in a sequence of three represented generally at 160 in FIG. 5. Decoder 178a is provided positive power supply and ground inputs, respectively, from lines 340 and 342 and, as in the case of decoder 168a, provides sequential enabling signals to first tier decoders 176a–176h through eight line array 382 and to decoders 176i, 176j and 176'a–176'f through eight line array 384. In similar fashion, an eight line array 386 extending from a next second tier decoder of the general designation of 178 (not shown) as described at FIG. 5 provides enablement to eight first tier decoders commencing with decoder 176'g.

Four line array 380 extending from counter 181 is coupled with a corresponding four line array 388 which, in turn, extends in driving relationship to the remaining second tier decoders, generally designated 178, to effect the simultaneous drive thereof. The sequential enablement of decoder 178a is derived by a signal provided from line 390 extending from the output of a demultiplexer 162. In similar fashion, demultiplexer 162 sequentially enables the remaining decoders generally designated 178 from along lines 394 and 396.

Third tier decoder or demultiplexer 162 is driven from a 2-bit output counter 182 which is clocked from along line 398. Line 398 is seen to be coupled with the carry output of second tier counter 181.

Counter 182 provides an output along lines 400 and 402 to the input of demultiplexer 162. The output of demultiplexer 162 has been described as including lines 390, 394 and 396. A fourth successive output is provided at line 404 which is coupled to the input of a one-shot multivibrator 406. Component 406 is coupled with plus power supply and ground lines 210 and 212, respectively, through lines 408 and 410 and serves to provide a pulsed output at lines 412 and 414 which constitutes the vertical synchronization output for electronics region 120. Line 414 also is coupled to the clear input of counter 182 and serves to reset it in appropriate fashion. Without the use of one-shot multivibrator 406, the signal level at line 404 would remain steady state and not be available for this synchronization function.

From the foregoing, it may be observed that an electronic recordation of wavefront is available under the teachings of the instant invention. Where real time imaging and transmission of the imaging signals to remote reconstruction stages are involved, an adequate frame rate, for example of 20 to 30 frames per second, is required. For the aperture definition density described above, 589,824 data points per quadrant must be accommodated for. Therefore, with respect to a frame rate of 25 frames per second, frequencies in the range of 15 Megahertz will be encountered. As is apparent, the higher the density or spacial frequency of imaging data points provided with the system, the more flexibility and image improvement will be achieved.

Since certain changes may be made in the above-described system and apparatus without departing from scope of the invention herein invovled, it is intended that all matter contained in the description thereof or shown in the accompanying drawings shall be interpreted as illustrative and not in a limiting sense.

I claim:

1. A system for generating electric signals corresponding with a holographic representation of an object, comprising:
   means for providing a coherent source of light;
   means for illuminating said object with said coherent source of light;
   means for providing a reference beam from said coherent source of light;
   image receiving means having a receiving surface oriented for receiving light reflecting from said illumianted object and, simultaneously from said reference beam to form an interference pattern, said receiving means having a matrix of predetermined aperture defining locations at said receiving surface, each electrically addressable in a select scan sequence to effect generation of an electrical data signal of amplitude corresponding with the intensity of said light interference pattern at said addressed aperture defining location; and
   control means for electrically addressing said matrix of aperture defining location in accordance with said select scan sequence at a predetermined scanning rate and for providing a scanning synchronization signal.

2. The system of claim 1 in which:
   each said image receiving means aperture defining location, when electrically addressed, is present as a light transmissive region of predetermined effective diameter; and
   said image receiving means further includes light detecting means adjacent said aperture defining locations and responsive to light passing through a said light transmissive region to generate said data signal.

3. The system of claim 1 in which said image receiving means comprises:
   means for retaining a dipolar, normally opaque medium, light transmissive in the presence of an applied electric field adjacent said receiving surface; and
   first and second arrays of transparent electrodes adjacent to said medium and mutually electrically addressable by said control means to apply a said electric field of predetermined value at a select said aperture defining location.

4. The system of claim 1 in which said image receiving means comprises:
   first and second planar supports spaced a predetermined distance apart, one said support having said receiving surface;

a normally opaque medium, light transmissive in the presence of an applied electrical field, positioned intermediate said first and second transparent supports; and first and second arrays of parallel, electrically conductive electrodes respectively positioned upon said first and second supports and mutually oriented to define a matrix of spaced electrode crossing locations corresponding with said matrix of aperture defining locations and electrically addressable to provide a discrete electric field within said medium.

5. The system of claim 4 in which said first and second arrays are comprised of transparent electrodes, said arrays being mutually orthogonally disposed upon the mutually inwardly facing surfaces of respective said first and second transparent supports.

6. The system of claim 5 in which said normally opaque medium is a dipolar electro-optical medium.

7. The system of claim 6 in which said dipolar electro-optical medium comprises a suspension of Herapathite dipoles.

8. The system of claim 5 in which said control means includes scan means for sequentially imposing a first electrical state of one polarity upon a select plurality of electrodes of one of said first and second arrays, while simultaneously imposing a second electrical state of opposite polarity upon a select one of said electrodes of the other of said first and second arrays.

9. The system of claim 8 in which said control means scan means first and second electrical states are selected to establish a constant value electrical field at each said crossing location.

10. The system of claim 9 in which said control means includes threshold means for imposing a predetermined preliminary level of said electrical states upon all electrodes within said first and second arrays, said level being selected below that achieving a transmission of said light through said normaly opaque medium.

11. The system of claim 8 in which said electrodes each comprise a conductive transparent metal oxide layer.

12. Apparatus for converting a holographic light interference pattern to electrical signals, comprising:

first and second supports spaced a predetermined distance apart, said first support having a transparent surface positionable to receive said interference pattern;

a first array of parallel, electrically conductive electrodes supported in a first predetermined orientation by said first support;

a second array of parallel, electrically conductive electrodes supported in a second predetermined orientation by said second support to define with said first array of electrodes a matrix of spaced electrode crossing locations;

a normally opaque medium, light transmissive in the presence of an applied electrical field, positioned intermediate said first and second supports;

control means electrically coupled with said first and second electrode arrays for sampling said matrix of locations by generating an electrical field of predetermined value between sequentially selected pairs of electrodes within said first and second arrays thereof; and light responsive detecting means oepratively associated with said second support for deriving an electrical output signal corresponding with the light intensity of said interference pattern at a said sampled matrix location.

13. The apparatus of claim 12 in which said first and second arrays of electrodes are transparent and mutually orthogonally disposed upon the mutually inwardly facing surfaces of respective said first and second supports.

14. The apparatus of claim 12 in which said normally opaque medium is a dipolar electro-optical medium.

15. The apparatus of claim 14 in which said dipolar electro-optical medium comprises a suspension of Herapathite dipoles.

16. The apparatus of claim 12 in which said control means includes scan means for sequentially imposing a first electrical state of one polarity upon successive ones of a select plurality of electrodes of one said array, while simultaneously imposing a second electrical state of opposite polarity upon a select one of said electrodes of the other said array.

17. The apparatus of claim 16 in which said control means scan means first and second electrical states are selected to establish a constant value electrical field at each said crossing location.

18. The apparatus of claim 16 in which said control means includes threshold means for imposing a predetermined preliminary level of said electrical states upon all electrodes within said first and second arrays, said level being selected below that achieving a transmission of said light through said normally opaque medium.

19. The apparatus of claim 16 in which said scan means comprises:

first decoder means having a plurality of selectively activated discrete outputs each operatively associated with a discrete said electrode of one said array thereof;

a voltage source; and a plurality of discrete signal director means each coupled with a said first decoder means discrete output, said operatively associated discrete electrode and said voltage source, and responsive to said select activation to communicate said voltage source with said operatively associated discrete electrode to establish said first electrical state.

20. The apparatus of claim 19 in which said scan means further comprises second decoder means having a plurality of discrete outputs each coupled with a discrete said electrode of the other of said arrays thereof, said outputs being selectively activated to derive said second electrical state in predetermined synchronism with said first decoder means discrete output activation.

21. The apparatus of claim 19 in which each said signal director means comprises a differential amplifier.

22. The apparatus of claim 12 in which each said electrode comprises a conductive transparent metal oxide layer.

23. The apparatus of claim 12 in which each said electrode comprises an indium oxide layer.

24. The apparatus of claim 12 in which:

said first and second arrays of electrodes are mutually orthogonally disposed upon the mutually inwardly facing surfaces of respective said first and second supports; and said normally opaque medium is a dipolar electro-optical medium.

25. The apparatus of claim 24 in which:

said control means includes scan means for sequentially imposing a first electrical state of one polarity upon a select plurality of electrodes of one said array while simultaneously imposing a second electrical state of opposite polarity upon a select one of said electrodes of the other said array; and said control means scan means first and second electrical states are selected to establish a constant value electrical field at each said crossing location.

26. The apparatus of claim 25 in which said control means includes threshold means for imposing a predetermined preliminary level of said first and second electrical states upon all electrodes within said first and second arrays, said level being selected below that achieving a transmission of said light through said normally opaque medium.

27. Apparatus for generating a hologram in response to a holographic data derived as a sequence of electrical synchronizing and data signals, said data signals corresponding with the intensities of a light interference pattern generated by a source of coherent light of predetermined wavelength characteristic sampled in the scan of a matrix of uniform discrete apertures adjacent said pattern, comprising:

first and second planar transparent supports spaced a predetermined distance apart, a surface of said first support being positionable for receiving light from a coherent source of said predetermined wavelength characteristic;

a first array of parallel, transparent, electrically conductive electrodes supported in a first predetermined orientation by said first transparent support;

a second array of parallel, transparent, electrically conductive electrodes supported in a second predetermined orientation by said second transparent support to define with said first array of electrodes a matrix of spaced electrode crossing locations geometrically corresponding with said matrix of uniform discrete apertures;

a normally opaque medium, light transmissive in the presence of an applied electrical field, positioned intermediate said first and second transparent supports; and control means electrically coupled with said first and second electrode arrays, responsive to said synchronizing and data signals for generating an electrical field of value corresponding with said data signals between electrodes of said first and second arrays at said crossing locations in a sequence regulated by said synchronizing signals.

28. The apparatus of claim 27 in which said first and second arrays of electrodes are transparent and mutually orthogonally disposed upon the mutually inwardly facing surfaces of respective said first and second supports.

29. The apparatus of claim 27 in which said normally opaque medium is a dipolar electro-optical medium.

30. The apparatus of claim 29 in which said dipolar electro-optical medium exhibits a light transmissive dwell interval corresponding with the interval for said scan of said matrix.

31. The apparatus of claim 27 in which said control means comprises scan means for imposing first electrical states of one polarity upon a select plurality of electrodes of one said array in a sequence corresponding with said sampling scan, while simultaneously imposing second electrical states of opposite polarity upon a select one of said electrodes of the other said array.

32. The apparatus of claim 31 in which said control means includes threshold means for imposing a predetermined preliminary level of said electrical states upon all electrodes within said first and second arrays, said level being selected below that achieving a transmission of said light through said normally opaque medium.

33. The apparatus of claim 31 in which said scan means comprises:

first decoder means having a plurality of selectively activated discrete outputs each operatively associated with a discrete electrode of one said array;

receiver means for receiving said data signals and having a voltage level output corresponding therewith; and a plurality of discrete signal director means each coupled with a said first decoder means discrete output, said operatively associated discrete electrode and said receiver means output, and responsive to said select activation to communicate said voltage level output with said operatively associated discrete electrode to establish said first electrical state.

34. The apparatus of claim 33 in which said scan means further comprises second decoder means having a plurality of discrete outputs each coupled with a discrete said electrode of the other of said array thereof, said outputs being selectively activated to derive said second electrical state in predetermined synchronism with said first decoder means discrete output activation.

35. The apparatus of claim 33 in which said signal director means comprises a differential amplifier.

36. The apparatus of claim 27 in which each said electrode comprises a transparent metal oxide layer.

37. The apparatus of claim 27 in which each said electrode comprises an indium oxide layer.

38. The apparatus of claim 27 in which:
said first and second arrays of electrodes are mutually orthogonally disposed upon the mutually inwardly facing surfaces of respective said first and second supports; and said normally opaque medium is a dipolar electro-optical medium.

39. The apparatus of claim 38 in which said control means comprises scan means for imposing first electrical states of one polarity upon a select plurality of electrodes of one said array in a sequence corresponding with said sampling scan, while simultaneously imposing second electrical states of opposite polarity upon a select one of said electrodes of the other said array.

40. The apparatus of claim 39 in which said control means includes threshold means for imposing a predetermined preliminary level of said electrical states upon all electodes within said first and second arrays, said level being selected below that achieving a transmission of said light through said normally opaque medium.

41. A system for constructing, transmitting and reconstructing holographs of an object comprising:

means for providing a coherent source of light of predetermined wavelength characteristic;

means for illuminating said object with said coherent source of light;

means for providing a reference beam from said coherent source of light;

first and second substantially planar supports spaced a predetermined distance apart, said first support having a transparent receiving surface for receiving light reflecting from said illuminated object and, simultaneously, from said reference beam to form an interference pattern;

a first array of parallel, electrically conductive electrodes supported in a first predetermined orientation by said first support;

a second array of parallel, electrically conductive electrodes supported in a second predetermined orientation by said second support to define with said first array of electrodes a first matrix of spaced electrode crossing locations;

a first normally opaque medium, light transmissive in the presence of an applied electric field, positioned intermediate said first and second supports;

first control means electrically coupled with said first and second electrode arrays for sequentially sampling said matrix of locations by generating an electrical field of predetermined value between sequentially selected pairs of electrodes of said first and second arrays and for providing a scanning synchronization signal;

light responsive detecting means operatively associated with said second support for deriving an electrical data signal corresponding with the light intensity of said interference pattern at a said sampled matrix location;

means for conveying said scanning synchronization signals and said data signals;

third and fourth transparent supports spaced a predetermined distance apart, said third surface being positionable for receiving light from a coherent source of said predetermined wavelength characteristic;

a third array of parallel, electrically conductive electrodes supported in a third predetermined orientation by said third support;

a fourth array of parallel, electrically conductive electrodes suported in a fourth predetermined orientation by said fourth transparent support to define with said third array of electrodes a second matrix of spaced electrode crossing locations geometrically corresponding with said first matrix;

a second normally opaque medium, light transmissive in the presence of an applied electrical field, positioned intermediate said third and fourth transparent supports; and second control means electrically coupled with said third and fourth electrode arrays, responsive to said conveyed scanning synchronization signals and said data signals for generating an electrical field of value corresponding with said data signals between electrodes of said third and fourth arrays at said crossing location in a sequence regulated by said synchronizing signals.

42. The system of claim 41 in which:

said first and second arrays of electrodes are mutually orthogonally disposed upon the mutually inwardly facing surfaces of respective said first and second supports; and said third and fourth arrays of electrodes are mutually orthogonally disposed upon the mutually inwardly facing surfaces of respective said third and fourth supports.

43. The system of claim 42 in which each said first and second normally opaque medium is dipolar electro-optical medium.

44. The system of claim 43 in which said first control means comprises first scan means for sequentially imposing a first electrical state of one polarity upon successive ones of a select plurality of electrodes of one of said first and second arrays, while simultaneously imposing a second electrical state of opposite polarity upon a select one of said electrodes of the other of said first and second arrays.

45. The system of claim 44 in which said first control means first scan means first and second electrical states are selected to establish a constant value electrical field at each crossing location.

46. The system of claim 45 in which said second control means comprises second scan means for imposing third electrical staes of one polarity successively upon a select plurality of electrodes of one of said third and fourth arrays in a sequence corresponding with said first control means first scan means sequence, while simultaneously imposing third electrical states of opposite polarity upon a select one of said electrodes of the other of said third and fourth arrays.

* * * * *